United States Patent
Crawford (10) Patent No.: US 10,605,198 B2
(45) Date of Patent: Mar. 31, 2020

(54) NACELLE THRUST REVERSER (71) Applicant: Rohr, Inc., Chula Vista, CA (US)

(72) Inventor: Sara Christine Crawford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 1195 days.

(21) Appl. No.: 15/130,535

(22) Filed: Apr. 15, 2016

(65) Prior Publication Data
US 2017/0298869 A1   Oct. 19, 2017

(51) Int. Cl.
*F02K 1/72* (2006.01)
*F02K 1/70* (2006.01)
*F02K 1/80* (2006.01)
*F02K 1/62* (2006.01)

(52) U.S. Cl.
CPC ............. *F02K 1/72* (2013.01); *F02K 1/62* (2013.01); *F02K 1/625* (2013.01); *F02K 1/70* (2013.01); *F02K 1/805* (2013.01)

(58) Field of Classification Search
CPC ..... F02K 1/09; F02K 1/72; F02K 1/80; F02K 1/805; F02C 7/28; F05D 2240/55
See application file for complete search history.

(56) References Cited

U.S. PATENT DOCUMENTS

| | | | | |
|---|---|---|---|---|
| 4,030,291 A * | 6/1977 | Sargisson | ........ | F02K 1/70 60/226.2 |
| 4,468,043 A * | 8/1984 | Brazel | ........ | F16J 15/065 277/651 |
| 4,549,708 A * | 10/1985 | Norris | ........ | B64D 29/06 244/129.4 |
| 4,998,409 A * | 3/1991 | Mutch | ........ | F02K 1/72 239/265.29 |
| 5,039,171 A * | 8/1991 | Lore | ........ | F02K 1/70 239/265.29 |
| 6,042,156 A * | 3/2000 | Jackson | ........ | B64D 29/06 292/247 |
| 6,151,883 A * | 11/2000 | Hatrick | ........ | F02K 1/72 239/265.29 |
| 6,237,325 B1 * | 5/2001 | Hogie | ........ | B64D 45/02 60/226.2 |
| 6,334,588 B1 * | 1/2002 | Porte | ........ | B64D 29/06 244/129.4 |
| 6,892,526 B2 * | 5/2005 | Stretton | ........ | B64D 29/00 244/53 B |
| 8,122,702 B2 * | 2/2012 | Tsou | ........ | F02K 1/72 244/129.4 |
| 8,635,851 B2 * | 1/2014 | Vauchel | ........ | F01D 11/005 244/110 B |
| 8,769,926 B2 * | 7/2014 | Vauchel | ........ | F02K 1/72 60/230 |
| 8,840,064 B2 * | 9/2014 | Bellanger | ........ | F02K 1/72 244/110 B |

(Continued)

*Primary Examiner* — Gerald L Sung
*Assistant Examiner* — Marc J Amar
(74) *Attorney, Agent, or Firm* — Cantor Colburn LLP (57) ABSTRACT

A thrust reverser of a nacelle is orientated at least in-part about a fan case of a turbofan engine. The thrust reverser includes an outer fixed structure assembly and a radial spacer. The outer fixed structure assembly circumferentially extends about a centerline and is spaced, at least in part, radially outward from the fan case. The radial spacer is engaged to the outer fixed structure assembly and is in sliding contact with the fan case.

14 Claims, 8 Drawing Sheets

(56) References Cited

U.S. PATENT DOCUMENTS

| | | | |
|---|---|---|---|
| 8,887,511 B2* | 11/2014 | Germain | B64D 29/06 |
| | | | 244/110 B |
| 8,899,013 B2 | 12/2014 | Hurlin et al. | |
| 9,212,624 B2 | 12/2015 | Aten | |
| 9,435,266 B2* | 9/2016 | Sutterfield | F02K 1/805 |
| 9,551,298 B2* | 1/2017 | Binks | F02K 1/09 |
| 9,677,425 B2* | 6/2017 | Lavignotte | F02K 1/70 |
| 2012/0079804 A1* | 4/2012 | Stuart | F02K 1/72 |
| | | | 60/226.2 |
| 2014/0325957 A1* | 11/2014 | Aten | F02K 1/766 |
| | | | 60/226.2 |
| 2015/0308380 A1 | 10/2015 | Biset | |
| 2015/0369083 A1* | 12/2015 | Mercier | B64D 29/06 |
| | | | 415/214.1 |
| 2016/0201561 A1* | 7/2016 | Lussier | F02C 7/20 |
| | | | 415/213.1 |
| 2016/0222916 A1* | 8/2016 | Provost | F01D 11/005 |

* cited by examiner

NACELLE THRUST REVERSER

BACKGROUND

The present disclosure relates to a nacelle thrust reverser for an aircraft, and more particularly, to a radial spacer of the thrust reverser in contact with a fan case.

Jet powered aircraft employ thrust reversers to reduce aircraft speed during landing. Thrust reversers generally expel fan bypass airflow in a forward direction to create reverse thrust. The thrust reversers typically employ cascades to direct the exhausted fan bypass airflow. In some thrust reverser designs, the array of cascades may translate rearward from a stowed position to a deployed position, and in the stowed position the cascades may be at least partially positioned radially over and around the fan case. In such thrust reverser designs, there is a need for effective load paths to react loads and for deflection limiters to limit deflections.

SUMMARY

A thrust reverser of a nacelle oriented at least in-part about a fan case of a turbofan engine, the thrust reverser including an outer fixed structure assembly circumferentially extending about a centerline and spaced at least in part radially outward from the fan case; and a radial spacer engaged to the outer fixed structure assembly and in sliding contact with the fan case.

Additionally to the foregoing embodiment, the sliding contact is in an axial direction.

In the alternative or additionally thereto, in the foregoing embodiment, the outer fixed structure assembly includes a substantially cylindrical floor panel having a forward end portion and a rearward end portion and the spacer is proximate to the forward end portion.

In the alternative or additionally thereto, in the foregoing embodiment, the thrust reverser includes a V-blade/groove interface constructed and arranged to connect the rearward end portion to the fan case.

In the alternative or additionally thereto, in the foregoing embodiment, the thrust reverser includes a thrust reverser fixed outer cowl circumferentially extending about the centerline and spaced radially outward from the outer fixed structure assembly; and a forward bulkhead extending radially between and engaged to the forward end portion and the thrust reverser fixed outer cowl.

In the alternative or additionally thereto, in the foregoing embodiment, the thrust reverser includes a cascade assembly circumferentially extending about the centerline and disposed substantially between the thrust reverser fixed outer cowl and the outer fixed structure assembly when in a stowed state.

In the alternative or additionally thereto, in the foregoing embodiment, the thrust reverser includes a hook device carried between the fan case and a forward end portion of the cascade assembly, and wherein the hook device is mated for translating load when the cascade assembly is in a deployed state.

In the alternative or additionally thereto, in the foregoing embodiment, the load is translating at least in-part in the axial direction.

In the alternative or additionally thereto, in the foregoing embodiment, the radial spacer is a resiliently compressible bumper.

In the alternative or additionally thereto, in the foregoing embodiment, the thrust reverser is a C-duct thrust reverser including first and second segments attached at a hinge including a pivoting axis disposed substantially parallel to the centerline.

In the alternative or additionally thereto, in the foregoing embodiment, the thrust reverser includes a shear web extending circumferentially about the centerline; a V-blade/groove interface constructed and arranged to detachably connect the shear web to the fan case; a first latch constructed and arranged to engage the first and second segments together, and being substantially axially aligned to the spacer; and a second latch constructed and arranged to engage the first and second segments together, and being substantially axially aligned to the V-blade/groove interface.

In the alternative or additionally thereto, in the foregoing embodiment, the radial spacer extends circumferentially about the centerline.

In the alternative or additionally thereto, in the foregoing embodiment, the radial spacer is one of a plurality of radial spacers spaced circumferentially about the centerline.

In the alternative or additionally thereto, in the foregoing embodiment, the radial spacer is a fire barrier.

In the alternative or additionally thereto, in the foregoing embodiment, the thrust reverser includes a fixed outer cowl circumferentially extending about the centerline, and wherein a substantially annular bulkhead of the outer fixed structure assembly is engaged to and spans radially between the fixed outer cowl and the spacer.

A C-duct thrust reverser for a nacelle of a turbofan engine according to another, non-limiting, embodiment includes a first segment extending circumferentially about a centerline when closed; a second segment extending circumferentially about the centerline and diametrically opposed to the first segment when closed; and wherein the first and second segments each include a portion of an outer fixed structure assembly extending circumferentially about the centerline, the outer fixed structure assembly including a radial spacer and a V-blade both projecting radially inward with the radial spacer spaced axially forward of the V-blade.

Additionally to the foregoing embodiment, the C-duct thrust reverser includes a forward latch carried between the first and second segments and aligned substantially axially to the radial spacer; and a rearward latch carried between the first and second segments and aligned substantially axially to the V-blade, and wherein the forward and rearward latches are both engaged when the first and second segments are closed.

In the alternative or additionally thereto, in the foregoing embodiment, the C-duct thrust reverser includes a hinge attached to the first and second segments and diametrically disposed opposite the forward and rearward latches.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
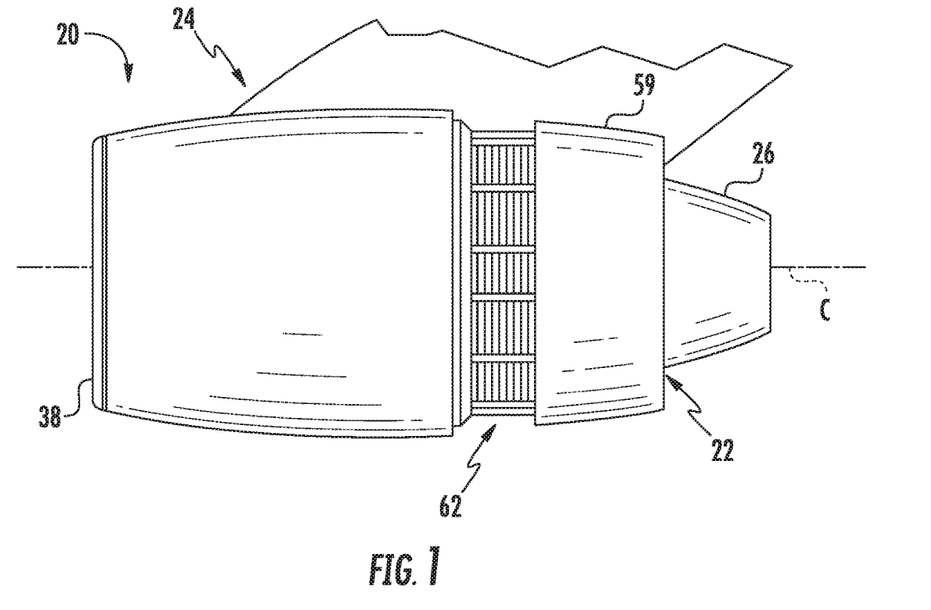
FIG. 1 is a side view of a turbofan engine with the thrust reverser deployed as one, non-limiting, application of the present disclosure.
Figure 2:
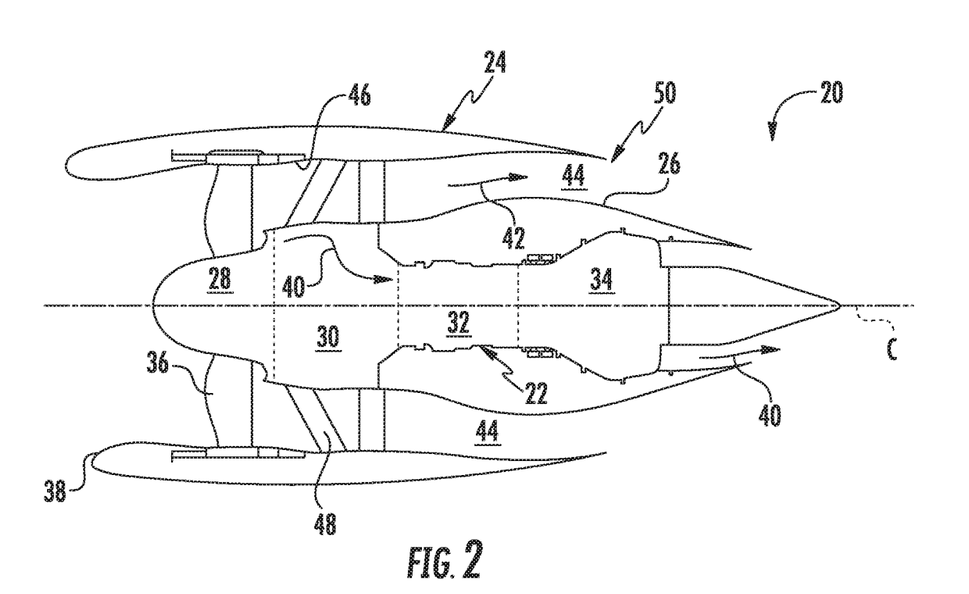
FIG. 2 is a diagrammatic cross section of the turbofan engine.

Referring to FIGS. 1 and 2, an aircraft nacelle 24 of a turbofan engine 20 generally surrounds a core cowl 26 that houses, at least in-part, an engine core 22. The engine core 22 may generally include a fan section, 28, a compressor section 30, a combustor section 32 and a turbine section 34 generally disposed along an engine centerline C. The fan section 28 may be mounted adjacent to an upstream end of the nacelle 24, and may include a series of fan blades 36 that rotate about the engine centerline C during engine operation so as to draw a flow of air into an inlet end 38 of the turbofan engine 20.

The airflow drawn into the engine 20 is accelerated by the rotating fan blades 36, and is generally divided into a core airflow (see arrow 40 in FIG. 2) and a bypass airflow (see arrow 42). The core airflow is directed into and through a multi-stage compressor section (not shown) within the engine core 22. The core airflow 40 is initially passed through the compressor section 30 to increase the airflow pressure, and then the pressurized core airflow 40 is passed through the combustor section 32, where the air is mixed with fuel and the mixture ignited. The combustion of the fuel-and-air mixture within the combustor section 32 causes the air to expand, which in-turn drives a series of turbine stages (not shown) of the turbine section 34 located toward the rear of the engine 20, to rotate and in-turn provide power to the fan section 28. As a heated exhaust gas, the core airflow 40 is then directed out of the rear of the engine core 22 downstream from the turbine section 34.

The bypass airflow 42 generally flows through a bypass flowpath or duct 44 located downstream of the fan blades 36. The bypass duct 44 may be annular and may include boundaries defined radially between the core cowl 26 and, at least in part, a fan case 46 of the fan section 28. When the engine is in operation with the thrust reverser 52 stowed, the bypass airflow 42 is accelerated by the rotating fan blades 36, passes through a plurality of outer guide vanes (OGVs) 48, through the bypass duct 44, and out through a fan nozzle assembly 50. The fan section 28 may produce a substantial portion of the engine thrust.

Figure 3:
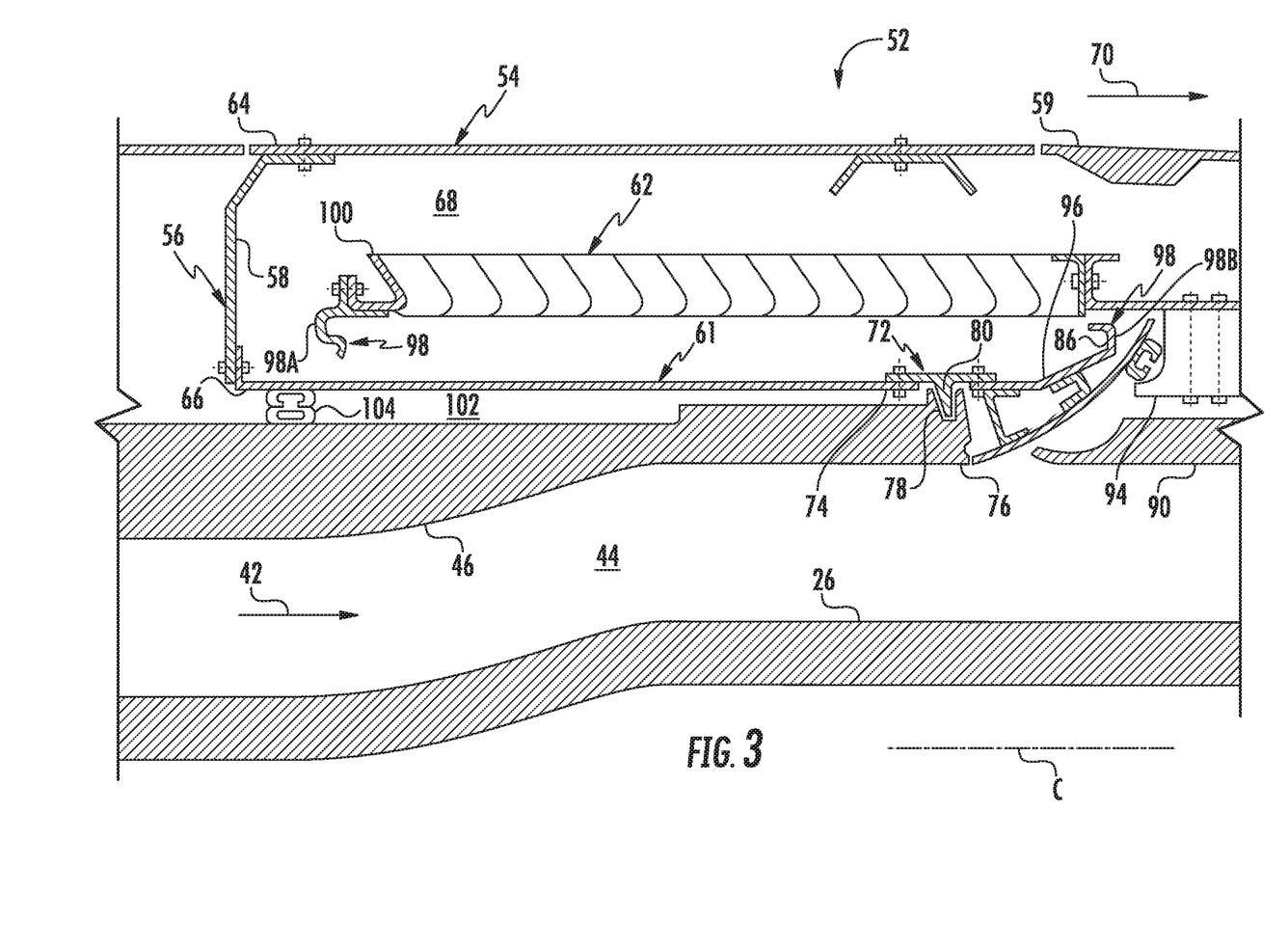
FIG. 3 is a partial cross section of a thrust reverser and a fan case of the turbofan engine.
Figure 4:
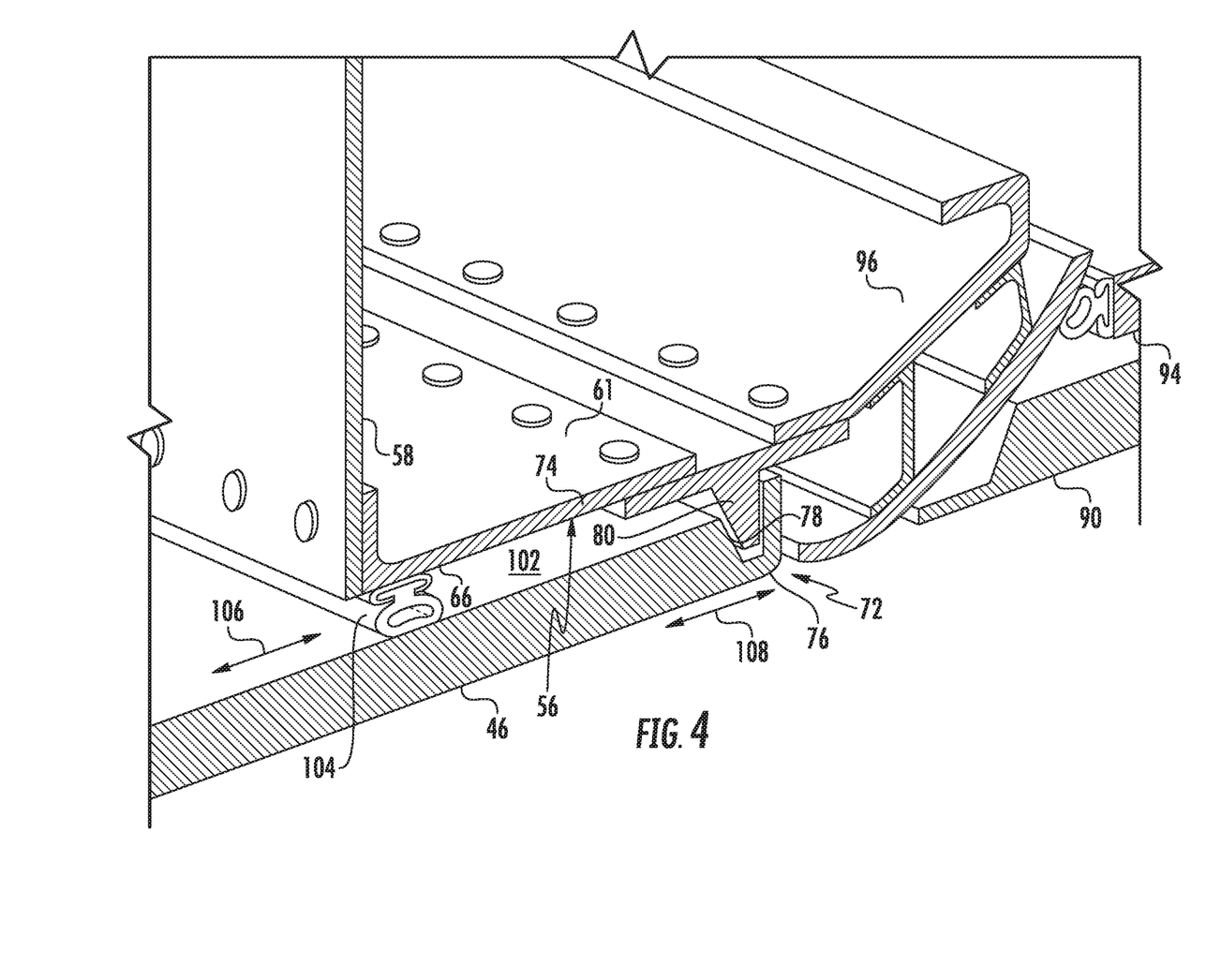
FIG. 4 is a perspective cross section of a portion of the turbofan engine illustrating a relationship between a fan case of the engine and an outer fixed structure assembly of the thrust reverser.

Referring to FIGS. 3 and 4, the aircraft nacelle 24 includes a thrust reverser 52 configured to redirect the bypass airflow 42. The thrust reverser 52 is generally disposed aft of the OGVs 48 and the fan case 46, but at least a portion may be be disposed radially outward from and overlap the fan case. The thrust reverser 52 may include a fixed outer cowl 54, an outer fixed structure (OFS) assembly 56, a translating sleeve 59 (also see FIG. 1), a blocker door assembly (not shown), and a cascade assembly 62 (also see FIG. 1). The fixed outer cowl 54 and the translating sleeve 59 may be substantially cylindrical and generally concentric to the centerline C. The translating sleeve 59 generally projects in an axial rearward direction (see arrow 70) from an aft end portion of the fixed outer cowl 54.

The OFS assembly 56 may include a bulkhead 58 that may be substantially annular, and a floor panel 61 that may be substantially cylindrical. The floor panel 61 may be engaged to and projects axially rearward from a radially inward end portion of the bulkhead 58. The fixed outer cowl 54 may be substantially axially aligned to and is spaced radially outward from the floor panel 61 of the OFS assembly 56. The bulkhead 58 extends radially between and may be engaged to axial forward end portions 64, 66 of the respective fixed outer cowl 54 and the floor panel 61. Together, the bulkhead 58, the fixed outer cowl 54, and the floor panel 61 may define the boundaries of a substantially annular, or ring-shaped, cavity 68 that is opened in a rearward direction (see arrow 70) for receipt of the cascade assembly 62.

A V-blade/groove interface 72, configured to transfer load substantially axially with respect to centerline C, may be carried between an aft end portion 74 of the floor panel 61 and an aft end portion 76 of the fan case 46. The V-blade/groove interface 72 may include a V-groove 78 having boundaries defined by the aft end portion 76 of the fan case 46, and a V-blade 80 engaged to and projecting radially inward from the aft end portion 74 of the floor panel 61. The V-groove 78 is thus opened in a radially outward direction, and both the V-groove 78 and the V-blade 80 may extend circumferentially about the centerline C. It is understood that the term "V-blade/groove interface" is a term of art known to one skilled in the art and need not imply that the V-groove 78 and the V-blade 80 are "V" shaped.

In operation and during thrust reverser 52 deployment, the translating sleeve 59 is configured to move (i.e., in the rearward direction 70) from a forward position (as shown in FIG. 3), and to a rearward or aft position (not shown). During thrust reverser 52 stowing operation, the translating sleeve 59 is configured to move from the aft position and back to the forward position. The cascade assembly 62 may include a plurality of cascades mounted in a radial pattern about the centerline C, and may be a translating cascade configured to move between stowed and deployed states. Therefore and also during thrust reverser 52 deployment, the translating cascade assembly 62 may be configured to move (i.e., in the rearward direction 70) from the stowed state (see FIG. 3), and to the deployed state (not shown). During thrust reverser 52 stowing operation, the cascade assembly 62 is configured to move from the deployed state and back to the stowed state. To actuate movement of the cascade assembly 62, it may be mounted or attached to the translating sleeve 59. Or, the cascade assembly 62 may be disconnected from the translating sleeve 59, and may be part of a lost motion device in the sense that the cascade assembly 62 moves at an axial distance that is less than the axial movement of the translating sleeve 59 and/or at a different rate as the cascade assembly moves between the stowed and deployed states.

During thrust reverser 52 deployment, the blocker door assembly (not shown) is also configured to deploy and thereby redirect the bypass airflow 42 from continuing through the bypass duct 44 to the fan nozzle assembly 50 when the translating sleeve 59 is in the aft position. The blocker door assembly 60 includes a plurality of blocker doors 90 circumferentially distributed about the centerline C, and may include at least one drag link (not shown) for each blocker door 90. Each blocker door 90 may be pivotally engaged to the translating sleeve 59. Each drag link may be pivotally engaged and extends between the core cowl 26 and a distal end of the blocker doors 90. In operation, as the translating sleeve 59 moves from the forward position and toward the aft position, each blocker door 90 pivots away from the inner transleeve panel 94 and into the bypass duct 44 as urged by the drag link. When the translating sleeve 59 is in the full aft position, the blocker doors 90 are fully deployed and a majority of the bypass airflow 42 is diverted through the deployed cascade assembly 62.

To transfer various loads and displacements produced by (for example) the thrust reverser deployment, as described above, the OFS assembly 56 may further include a shear web 96 that is part of, or projects in the axial rearward direction 70 from the aft end portion 74 of the floor panel 61. A detachable connection or hook device 98 may be carried between a forward end portion 100 of the cascade assembly 62 and the shear web 96 (i.e., see respective catches 98A, 98B of the hook device 98 in FIG. 3). The hook device 98 is adapted to be engaged when the cascade assembly 62 is in the deployed state (not shown) and disengaged when the cascade assembly 62 is in the stowed state (see FIG. 3). Engagement of hook device 98 may primarily facilitate the transfer of loads generated during reverse thrust operation from the cascade assembly 62 to the fixed structure, and to some degree it may also limit deflections.

Referring to FIGS. 3 and 4, a space 102 that may be annular is located forward of the V-blade/groove interface 72 and is radially defined by and between the floor panel 61 of the OFS assembly 56 and the fan case 46. The thrust reverser 52 may further include a radial spacer 104 located in the space 102. The spacer 104 may be engaged to the forward end portion 66 of the floor panel 61 proximate to the bulkhead 58, and projects radially inward to make contact with an outer surface of the fan case 46. The contact between the radial spacer 104 and the fan case 46 may be a sliding contact in an axial direction (see arrow 106 in FIG. 4). In operation, the radial spacer 104 permits limited axial displacement between the OFS assembly 56 and the fan case 46 that may be induced by axial loads (see arrow 108) transferred through, for example, the V-blade/groove interface 72, and/or thermal transients. The radial spacer 104 may further eliminate or reduce any radial displacement between, for example, the forward end portion 66 of the floor panel 61 and the fan case 46. It is further contemplated and understood that the radial spacer 104 may be engaged to the fan case 46 and may be in sliding contact with the floor panel 61.

In one embodiment, the radial spacer 104 may be a resiliently flexible bumper that extends circumferentially continuously about the centerline C. In such an embodiment, the spacer 104 may function as a fire barrier or seal. In another embodiment, the radial spacer 104 may include a plurality of discrete segments spaced circumferentially about the centerline C with each segment engaged to the OFS assembly 56 and in sliding contact with the fan case 46. Depending upon the application, the radial spacer 104 may be made of a hard material such as steel or a softer and/or resiliently flexible material.

Figure 5:
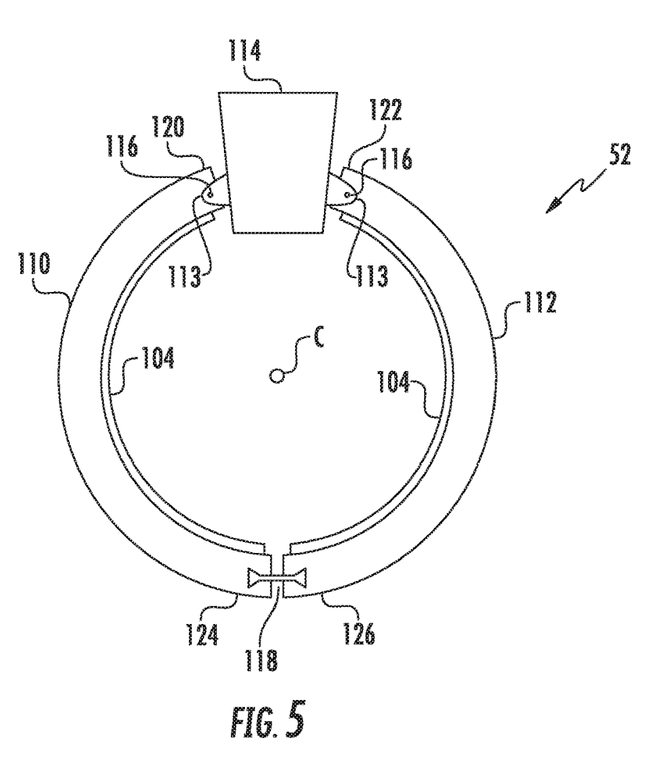
FIG. 5 is an axial cross section of the thrust reverser illustrated with two C-duct halves in a closed position.
Figure 6:
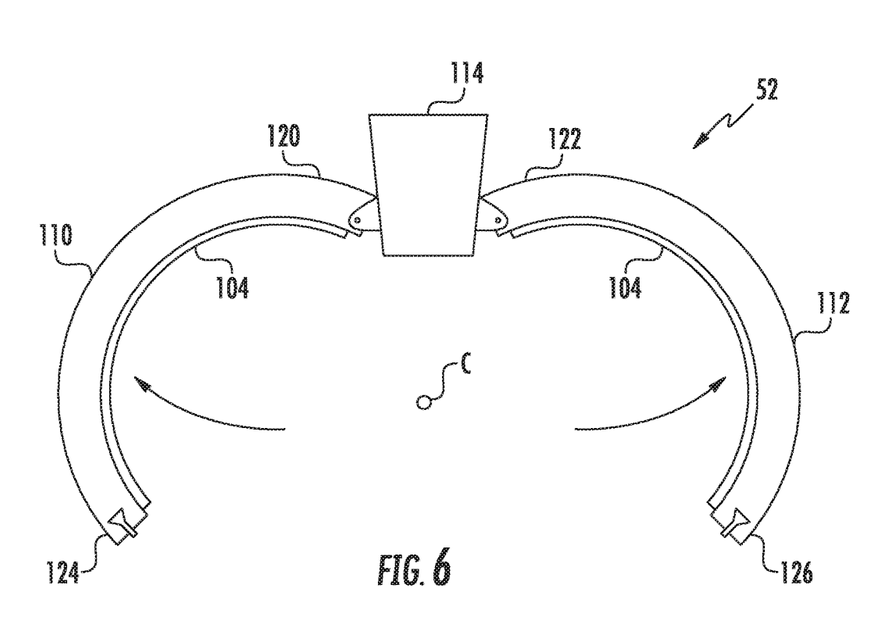
FIG. 6 is an axial cross section of the thrust reverser with the C-duct halves in an open position.

Referring to FIGS. 5 and 6, the thrust reverser 52 may be a 'C-duct' thrust reverser that enables maintenance and repair operations when, for example, the turbofan engine 20 is mounted to a wing of an aircraft. The C-duct thrust reverser 52 may include diametrically opposed segments 110, 112 each extending circumferentially about the centerline C less than 180 degrees to encapsulate/surround the engine, a plurality of hinges 113 connected to or passing through a pylon 114 spaced axially from one-another having one hinge line 116 disposed substantially parallel to centerline C, and a plurality of latches 118 spaced axially from one-another. Each segment 110, 112, extends circumferentially between respective base ends 120, 122 and respective distal ends 124, 126. The base ends 120, 122 are pivotally connected to the hinges 113 mounted on or passing through the pylon 114, and the latches are carried between the distal ends 124, 126.

When the C-duct thrust reverser 52 is closed (see FIG. 5) the segments 110, 112 are generally circumferentially continuous, the latches 118 are latched, the V-blade/groove interface 72 is engaged, and the radial spacer 104 is in contact with the fan case 46. When the C-duct thrust reverser 52 is open (see FIG. 6) the latches 118 are disengaged, the segments 110, 112 are circumferentially separated at the respective distal ends 124, 126, the V-blade/groove interface 72 is disengaged, and the radial spacer 104 is lifted off of the fan case 46.

Figure 7:
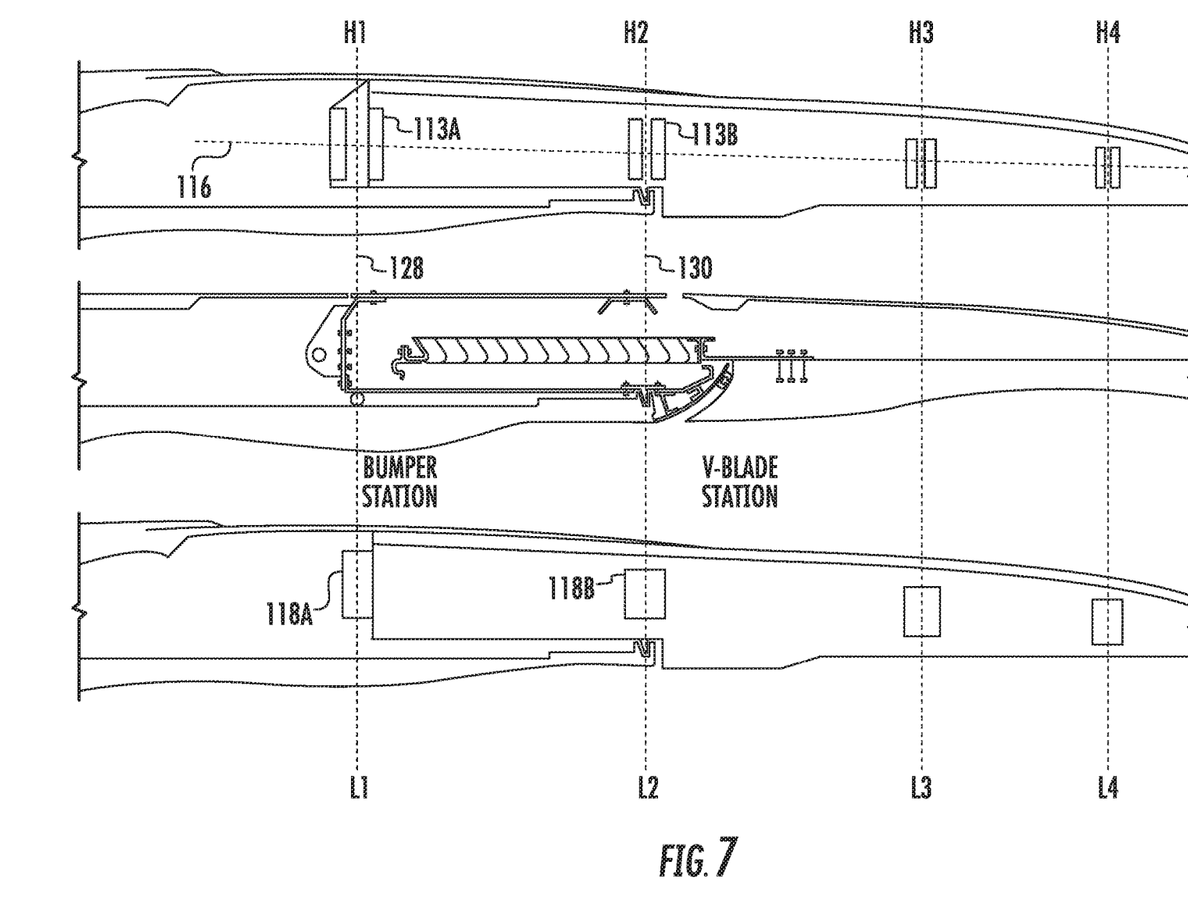
FIG. 7 is a cross sectional schematic illustrating three separate cross sections that, together, orientate an arrangement of hinges and latches of the thrust reverser with C-duct halves.

Referring to FIGS. 5 through 7, the plurality of latches 118 may include a forward latch 118A that may be a failsafe latch and is generally axially aligned with the radial spacer 104 (see imaginary spacer station line 128 in FIG. 7). Another latch 118B, which may be a failsafe latch, is located axially rearward of the forward latch 118A, may be generally axially aligned with the V-blade/groove interface 72 (see imaginary V-blade station line 130). The forward latch 118A facilitates and maintains contact between the radial spacer 104 and the fan case 46. Latch 118B facilitates and assures reliable connection of the V-blade/groove interface 72. It is further contemplated and understood that other latches may be carried between the distal ends 124, 126 of the respective segments 110, 112, and such latches may be located between latches 118A, 118B and/or rearward of the latch 118B described.

Each latch 118 may be associated with a respective hinge 113. More specifically latch 118A may be associated with a hinge 113A that lies in close proximity to the station line 128, and the latch 118B may be associated with a hinge 113B that lies along the V-blade station line 130.

Figure 8:
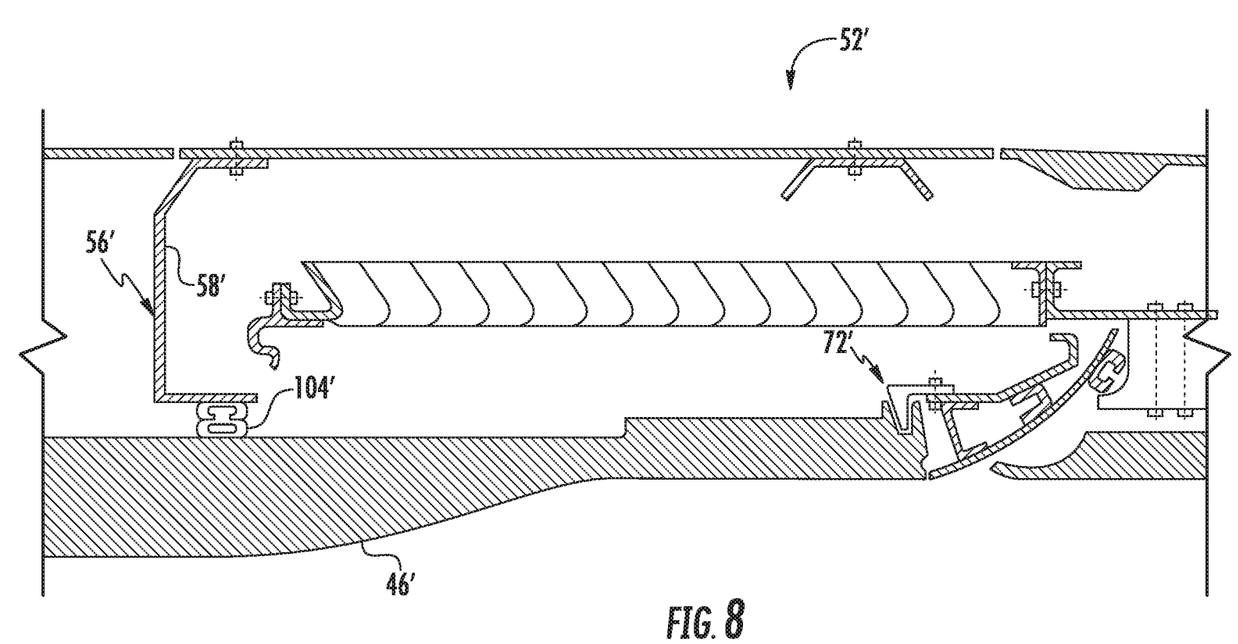
FIG. 8 is a partial cross section of a second embodiment of a thrust reverser mounted on a fan case of a turbofan engine.
Figure 9:
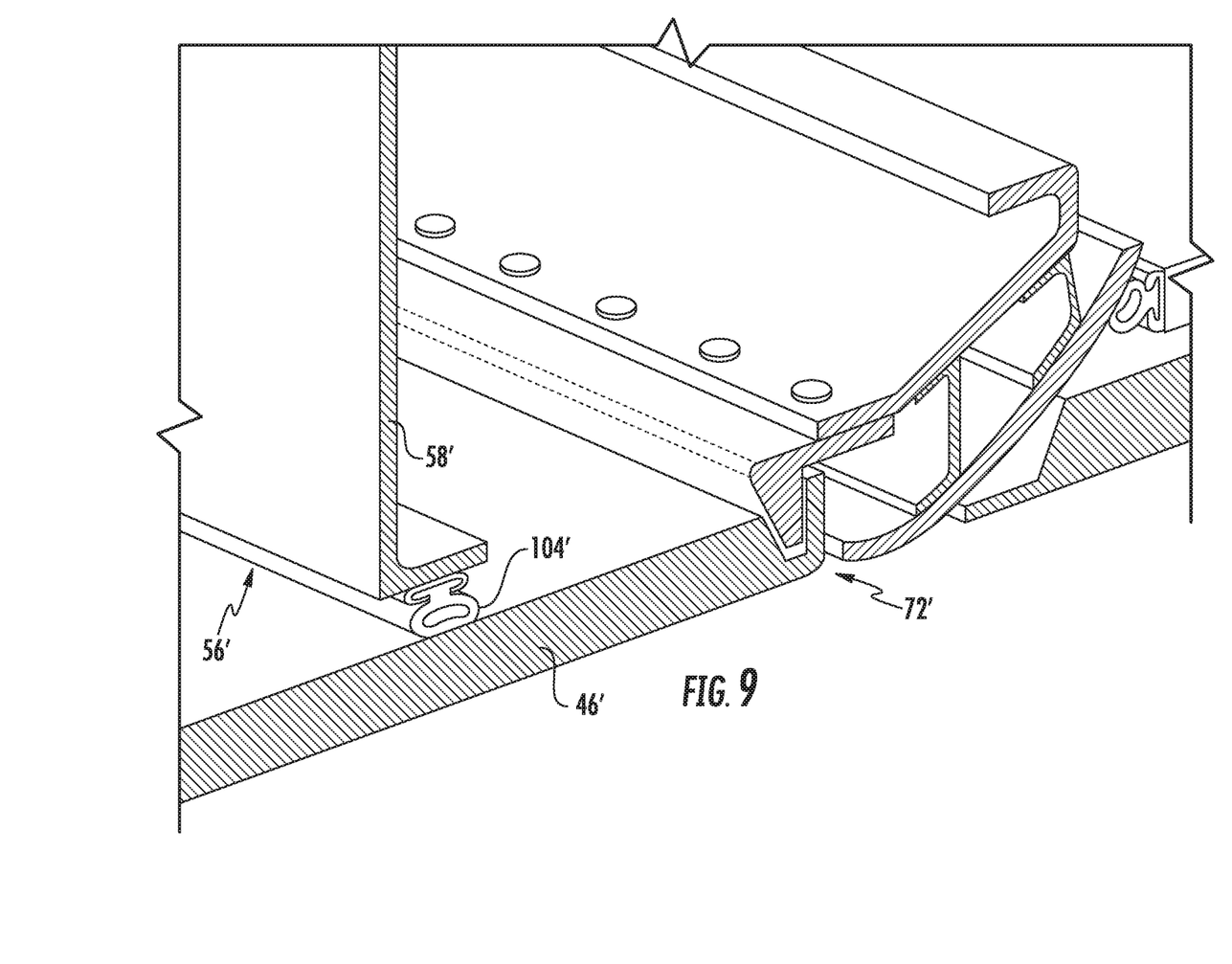
FIG. 9. is a perspective cross section of the thrust reverser of FIG. 8.

Referring to FIGS. 8 and 9, a second embodiment of a thrust reverser is illustrated wherein like elements to the first embodiment have like identifying numerals except with the addition of a prime suffix. A thrust reverser 52' may include an OFS assembly 56' that includes a bulkhead 58' that is spaced axially forward of a V-blade/groove interface 72' (i.e., the OFS assembly 56' does not include the floor panel of the first embodiment). A spacer 104' may be engaged to a radially inward end portion of the bulkhead 58' such that the spacer 104' is in sliding contact with a fan case 46'. The spacer 104' may be circumferentially continuous and may further function as a fire seal.

Figure 10:
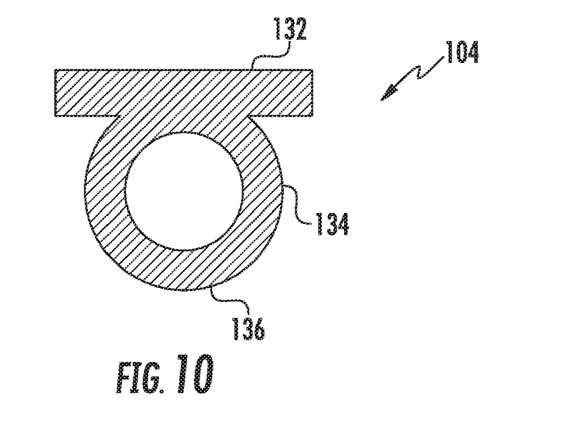
FIG. 10 is a cross section of a radial spacer of the thrust reverser.

Referring to FIG. 10, the radial spacer 104 may include a base flange 132 adapted to be connected to an underside of the OFS assembly 56 (not shown), and a distal portion 134 projecting radially inward from the flange 132. The distal portion 134 may be hollow to facilitate a degree of resilient compressibility, and may include a rounded or arcuate contact surface 136 that promotes sliding contact with the fan case 46 (not shown).

Figure 11:
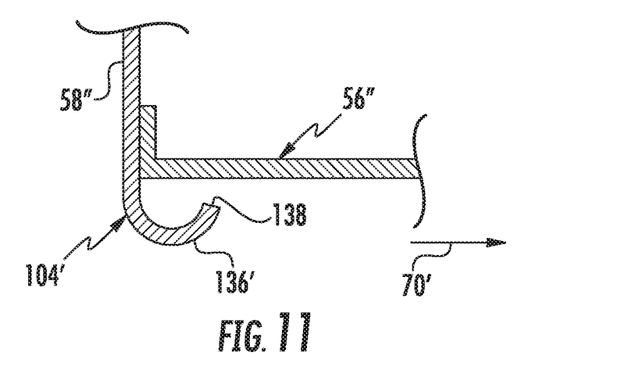
FIG. 11 is a cross section of a second embodiment of a radial spacer.

Referring to FIG. 11, a second embodiment of a radial spacer is illustrated wherein like elements to the first embodiment have like identifying numerals except with the addition of a prime symbol suffix. A radial spacer 104' may be formed as one unitary piece to a bulkhead 58". The spacer 104' may generally project radially inward from the bulkhead 58" then curve and project in a radial outward and axially rearward direction 70' to a distal end 138 spaced radially inward from an OFS assembly 56". The curvature of the radial spacer 104' provides a convex contact surface 136' (i.e., in cross section) to facilitate sliding contact with a fan case 46 (not shown).

Figure 12:
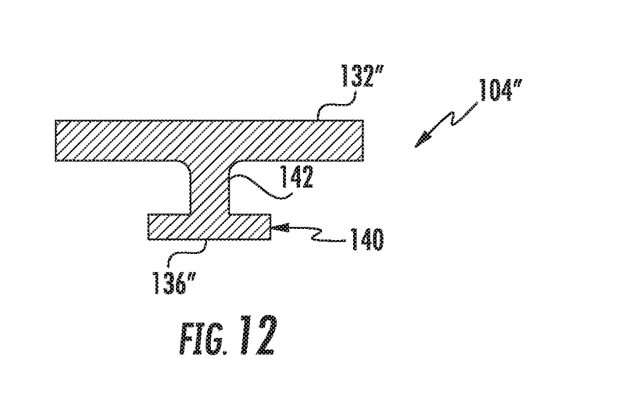
FIG. 12 is a cross section of a third embodiment of a radial spacer.

Referring to FIG. 12, a third embodiment of a radial spacer is illustrated wherein like elements to the first embodiment have like identifying numerals except with the addition of a double prime symbol suffix. A radial spacer 104" may include a base flange 132" adapted to be connected to an underside of the OFS assembly 56", a landing or enlarged head 140 spaced radially inward from the base flange 132" and a pedestal 142 that projects radially to engage the landing 140 to the base flange 132". The landing 140 carries a surface 136" for contact with a fan case 46 (not shown).

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

I claim:

1. A thrust reverser of a nacelle oriented at least in-part about a fan case of a turbofan engine, the thrust reverser comprising:
    an outer fixed structure assembly circumferentially extending about a centerline and spaced at least in part radially outward from the fan case, the outer fixed structure including a substantially cylindrical floor panel having a forward end portion and a rearward end portion, and a forward bulkhead;
    a radial spacer engaged to the outer fixed structure assembly and in sliding contact with the fan case, wherein the sliding contact is in an axial direction, and the spacer is proximate to the forward end portion; and
    a thrust reverser fixed outer cowl circumferentially extending about the centerline and spaced radially outward from the outer fixed structure assembly, wherein the forward bulkhead extends radially between and is engaged to the forward end portion and the thrust reverser fixed outer cowl, wherein the forward bulkhead is spaced axially forward of the radial spacer.

2. The thrust reverser set forth in claim 1 further comprising:
    a V-blade/groove interface constructed and arranged to connect the rearward end portion to the fan case.

3. The thrust reverser set forth in claim 1, wherein the radial spacer is a resiliently compressible bumper.

4. The thrust reverser set forth in claim 1, wherein the thrust reverser is a C-duct thrust reverser including first and second segments attached at a hinge including a pivoting axis disposed substantially parallel to the centerline.

5. The thrust reverser set forth in claim 4 further comprising:
    a shear web extending circumferentially about the centerline;
    a V-blade/groove interface constructed and arranged to detachably connect the shear web to the fan case;
    a first latch constructed and arranged to engage the first and second segments together, and being axially aligned to the spacer; and
    a second latch constructed and arranged to engage the first and second segments together, and being axially aligned to the V-blade/groove interface.

6. The thrust reverser set forth in claim 1, wherein the radial spacer extends circumferentially about the centerline.

7. The thrust reverser set forth in claim 1, wherein the radial spacer is one of a plurality of radial spacers spaced circumferentially about the centerline.

8. The thrust reverser set forth in claim 1, wherein the radial spacer is a fire barrier.

9. A thrust reverser of a nacelle oriented at least in-part about a fan case of a turbofan engine, the thrust reverser comprising:
    an outer fixed structure assembly circumferentially extending about a centerline and spaced at least in part radially outward from the fan case, the outer fixed structure assembly including a substantially cylindrical floor panel having a forward end portion and a rearward end portion, and a forward bulkhead;
    a fixed outer cowl circumferentially extending about the centerline and spaced radially outward from the outer fixed structure assembly;
    a translating sleeve circumferentially extending about the centerline, and radially aligned aft of the fixed outer cowl, the translating sleeve adapted to move axially between a forward position and a rearward position;
    the forward bulkhead extending radially between and engaged to the forward end portion and the thrust reverser fixed outer cowl, wherein an annular cavity is defined radially between the fixed outer cowl and the floor panel, and is defined axially by the bulkhead;
    a radial spacer engaged to the outer fixed structure assembly and in axial sliding contact with the fan case, the spacer being proximate to the forward end portion; and
    a cascade assembly circumferentially extending about the centerline and disposed substantially between the thrust reverser fixed outer cowl and the outer fixed structure assembly when in a stowed state, wherein the cascade assembly is in the cavity when in the stowed state and the translating sleeve is in the forward position.

10. The thrust reverser set forth in claim 9 further comprising:
    a hook device carried between the fan case and a forward end portion of the cascade assembly, and wherein the hook device is mated for translating load when the cascade assembly is in a deployed state.

11. The thrust reverser set forth in claim 10, wherein the load is translating at least in-part in the axial direction.

12. A C-duct thrust reverser for a nacelle of a turbofan engine, the C-duct thrust reverser comprising:
    a first segment extending circumferentially about a centerline when closed;

a second segment extending circumferentially about the centerline and diametrically opposed to the first segment when closed;

a cascade assembly at least partially axially forward of a V-blade when the cascade assembly is in a stowed position; and wherein the first and second segments each include a portion of an outer fixed structure assembly extending circumferentially about the centerline, the outer fixed structure assembly including a radial spacer and the V-blade both projecting radially inward with the radial spacer spaced axially forward of the V-blade.

13. The C-duct thrust reverser set forth in claim 12 further comprising:

a forward latch carried between the first and second segments and aligned axially to the radial spacer; and a rearward latch carried between the first and second segments and aligned axially to the V-blade, and wherein the forward and rearward latches are both engaged when the first and second segments are closed.

14. The C-duct thrust reverser set forth in claim 13 further comprising:

a hinge attached to the first and second segments and diametrically disposed opposite the forward and rearward latches.

\* \* \* \* \*